May 11, 1926.

L. M. CROW

LOCK CLASP FOR TIRE COVERS

Filed March 17, 1925

1,584,217

WITNESSES:
H. Gordon Miller
J. H. Pierce

LAWRENCE M. CROW INVENTOR

BY Louis Illmer
ATTORNEY

Patented May 11, 1926.

1,584,217

UNITED STATES PATENT OFFICE.

LAWRENCE M. CROW, OF WACO, TEXAS, ASSIGNOR TO CLIFTON MANUFACTURING COMPANY, OF WACO, TEXAS.

LOCK CLASP FOR TIRE COVERS.

Application filed March 17, 1925. Serial No. 16,126.

My invention relates to a novel clasp for fastening together the edges of vehicle tire covers, purses, bags and like articles, where it is desired to obtain a closure hold between any two overlapping flap sections and yet be able to conveniently detach same or make an adjustment in the effective length of the fabric binder to which my clasp may be applied.

The object of this invention is to produce a neat and efficient clasp fastener, more especially such as are adapted to be used in connection with removable tire covers now commonly disposed about the tread of spare tires in order to offer better protection against exposure, tear or defacement while in storage or when carried as a reserve tire along-side some part of a motor vehicle.

A further object is to provide an improved and practical clasp device that will be simple and economical to manufacture and that will require deliberate unlocking manipulation before said cover is removable from the spare vehicle tire which it is designed to sheath and protect. This improved type of clasp affords certain important advantages for this purpose over the conventional snap type of fasteners, in that the clamping action of my clasp fully compensates for any shrinkage or stretch on part of the cover fabric and otherwise allows for proper take-up in the fitted length of the tire cover.

The tire cover as used in connection with my clasp is preferably made up of a plurality of concaved strips of water proofed fabric such as rubberized cloth, patent leather or the like, which strips are usually sewed together and have their longitudinal cover edges inturned to constitute an internally open or incomplete tore-like shape adapted to snugly encircle the exterior tread surface of the tire. The cover is purposely made somewhat longer than the tire periphery to allow of longitudinally telescoping the end flaps of said cover. My clasp serves to clamp together the longitudinal border edges of these overlapping flaps after the cover has been assembled and suitably adjusted about the contour of a spare tire or the like, and thus prevent the cover from unintentionally becoming loose or inoperative.

In addition my clasp provides for an actuating lever by means of which the clasp can readily be manipulated, and in order to prevent the toe or clamping end of the lever from cutting or ultimately wearing through the clamped fabric, I provide for an intermediary metal tongue part against which said toe is intended to bear. Furthermore, my clasp is equipt with a U shaped resilient member having complementary jaws which are mounted and embraced within a suitable housing of similar shape. These jaws are made to adjustably but firmly clamp about one of the border edges of said adjacent overlapping cover flaps while the other of said flap edges is permanently united to one leg of the resilient element, which in turn serves to hold the clasp as a whole in positive relation upon the separable tire cover parts. Embodied herein are also other features of structure designed to facilitate the manufacture of said fastener and its application to tire cover purposes, all of which will be set forth in detail hereinafter.

Reference is had to the accompanying one sheet drawing which is illustrative of a preferred embodiment of my invention, like characters of reference indicate like parts throughout the several views, and in which drawings.

The constructive means whereby the indicated results are attained, partly reside in the novel sheet metal spring member which is mounted within said clasp housing. An actuating lever is provided capable of exerting a thrust between the housing and said internally disposed resilient element so as to spring together the open jaws of my clasp and clamp therebetween the overlapping border edge of the tucked-in tire cover, as will more fully appear presently.

Figure 1:
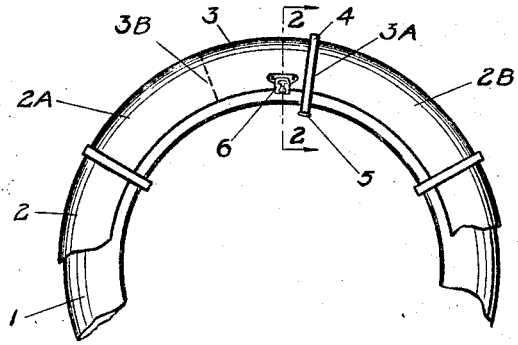
Fig. 1 is a partial elevational view of my clasp as applied to a tire cover partially showing same assembled and locked upon a spare tire.
Figure 2:
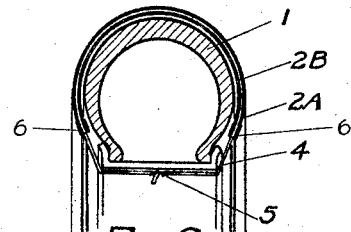
Fig. 2 represents an enlarged sectional view of said assembled cover as taken along line 2—2 of Fig. 1.
Figure 3:
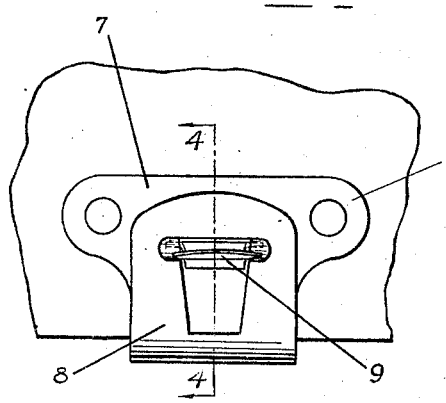
Fig. 3 is an enlarged front view of my clasp similar to that shown in Fig. 1 except that its actuating lever is raised into the unlatched position.

Referring first to Fig. 1, this shows a fragment of an unmounted or spare vehicle tire 1 of the conventional type, provided with a relatively narrow cover 2 adapted to protect the tread and otherwise embrace the tire contour. The length of the cover is purposely made longer than the tread periphery of the tire to the end that its outer and complementary inner end or flap portions designated as 2$^a$ and 2$^b$ respectively, will form the longitudinally telescoped cover section 3, in the manner indicated by dotted lines. The concealed transverse edge 3$^b$ of the flap 2$^b$ is tucked under the opposite or exposed transverse edge 3$^a$ of the overlapping flap 2$^a$.

In the event that the tire proper without wheel or other complementary parts are to be covered, then the longitudinal clasp tie between the overlapping cover flaps may be supplemented by circumferential tie means such as the cover strap 4 disposed along the outer or exposed transverse edge 3$^a$. Where desired, a plurality of similar shapes may be employed as indicated, but it is pointed out that these straps are not essential and are optional when used in connection with my clasp device.

My clasp as designated in its entirety by 6, may be mounted intermediate said transverse cover edges 3$^a$ and 3$^b$ and a clasp or clasps of this kind may be disposed along and united to either or both of the outer longitudinal cover edges and made to straddle the respective complementary inner cover edges so as to clamp together the overlapped flap portions 2$^a$ and 2$^b$ at one or more points.

Figure 10:
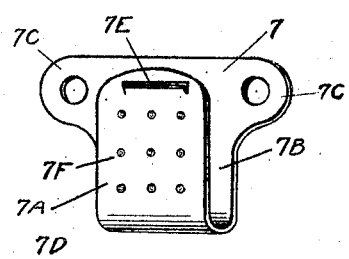
Fig. 10 shows structural details of the resilient or flat spring element of this clasp.

To this end, a U shaped housing 8 is made to fit over the flat metal resilient element 7 and snap engage therewith to form a united frame structure for my clasp. The resilient or spring element 7 as shown in Fig. 10, comprises complementary jaw members 7$^a$ and 7$^b$, which are tied together by the yoke portion 7$^d$; said jaw 7$^b$ is further provided with a set of laterally disposed perforated ears such as 7$^c$, which are intended to be riveted or otherwise permanently united to the inmost flap of the telescoped cover fabric. The opposite jaw 7$^a$ is provided with inwardly indented claw-like spurs 7$^f$ adapted to supplement the gripping action with respect to the interposed fabric flap 2$^b$, said jaw 7$^a$ is also equipt with a lip 7$^e$ struck out of the sheet metal and bent to project inwardly into the mouth of said clamp jaws.

Figure 8:
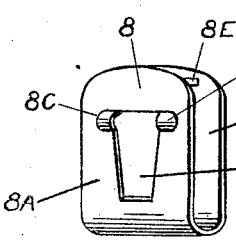
Fig. 8 is a perspective view of the relatively rigid U shaped housing of my clasp.

As is best shown in Fig. 8, the housing 8 is likewise fashioned into a U shape having a front leg 8$^a$ and a rear leg 8$^b$ suitably spaced to receive and embrace the similarly shaped jaws of the resilient element 7. It is preferred to make the housing 8 of relatively rigid metal and this is pierced by an elongated aperture 8$^d$ while the vertical edges thereof are each provided with struck-up aligned trunnion socket such as 8$^c$, which serves to pivotally mount the actuating lever 9. The rear leg 8$^b$ of said housing may be perforated to form a relatively long slot 8$^e$ adapted to receive and engage with the lip 7$^e$. When the spring element 7 is properly fitted down into the U shaped housing 8, the lip 7$^e$ is intended to snap into said slot 8$^e$ and maintain the parts in their proper superimposed relation as shown in the assembled frame structure.

Figure 9:
Fig. 9 represents a perspective view of the actuating lever of my device.

The structural details of the actuating lever 9 of my clasp are shown in Fig. 9; this comprises a manipulating or finger portion 9$^a$ equipt with a pair of laterally disposed trunnion such as 9$^b$ and said lever is also extended beyond the aligned trunnions and bent up to form the offset latch toe 9$^c$. It will be apparent that in my improved clasp, the toe 9$^c$ is made to bear upon the closed face of the interposed resilient jaw member 7$^b$ in such fashion that any movement on part of the toe is confined to metal parts without rubbing or allowing of wear upon either of the fabrics 2$^a$ or 2$^b$.

Having described the constructive features of my clasp device, its mode of operation may be traced as follows:

Figs. 3 to 6 make apparent how the respective clasp parts are to be assembled and fastened to the cover fabric. The united housing elements 7 and 8 are preferably riveted to the innermost of the longitudinal border edges of the cover flap 2$^a$ in the position previously specified.

Figures 4, 5, 7:
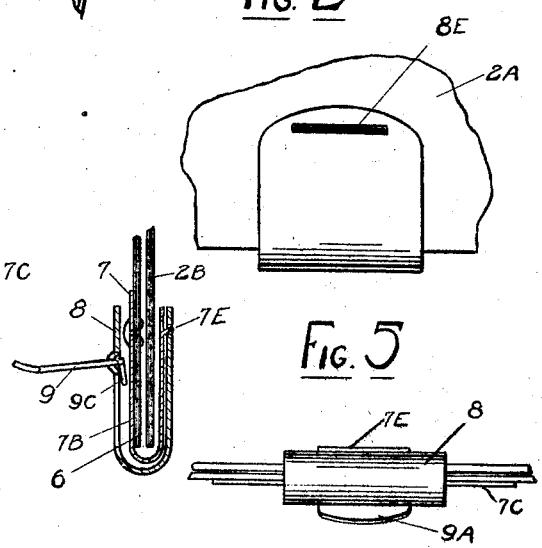
Fig. 4 is a sectional view of the assembled clasp and portions of the overlapping fabric cover as taken along line 4—4 of Fig. 3.
Fig. 5 shows an elevational rear view of the clasp.
Fig. 7 shows a bottom view of Fig. 3.
Figure 6:
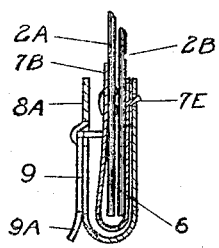
Fig. 6 represents a sectional view similar to Fig. 4 except that the actuating lever is thrown down into its flush or latched position to clamp together the overlapping border edges of the tire cover.

Fig. 4 shows the lever 9 raised into its unlatched position, which will cause the toe 9$^c$ to move away from the exposed face of the adjacent jaw 7$^b$ that lies alongside and covers the housing aperture 8$^d$. It will be apparent that said jaw at the same time serves to yieldingly hold the lever trunnions in their respective sockets. The separable longitudinal border edge of the concealed flap 2$^b$ now rests freely between the open clasp jaws 7$^a$ and 7$^b$, and thus can readily be adjusted or withdrawn therefrom as desired. When, however, the lever 8 is snapped down into its lower flush or latched position, the toe 9$^c$ will then exert a thrust against the exposed face of the resilient jaw 7$^b$ and spring the outer housing leg 8$^a$ away from said jaw 7$^b$ to form a wedge shaped space therebetween in the manner shown in Fig. 6. This in turn, will draw the rear leg 8ᵇ of the relatively rigid housing member 8 against the interposed cover flap 2ᵇ so as to close the gap between the clasp jaws and securely clamp said concealed flap in any adjusted position with respect to its overlapping flap 2ᵃ. When said lever is snapped down into its locked position, the spring 7 exerts a counter movement against the toe 9ᶜ and snugly presses the free lever end 9ᵃ into the housing aperture 8ᵈ and it will be observed that this lever end is externally disposed with respect to the tire cover proper and kept conveniently accessible for manipulating purposes.

In said locked position, the clasp prevents separation of the adjusted cover flap ends with respect to the encased spare tire. When the cover is initially smoothly fitted and stretched over the tire tread as described, the clasp or clasps will thereupon retain the cover in such a condition and impart thereto the desired neat appearance that will entirely satisfy requirements even when used in connection with the finest of motor cars.

It will be understood that the disclosed type of tire cover clasp is subject to modification in construction and that various changes in the details of my device may be resorted to without departing from the spirit and scope of my invention, heretofore described and more particularly defined in the appended claims.

Claims:

1. In a band-like cover member provided with separable longitudinally telescoped flap ends, a clasp secured along the longitudinal margin of one of said ends adapted to adjustably clamp the complementary overlapping edge of the other cover end, said clasp comprising a relatively rigid U shaped housing member and a supplementary U shaped resilient element embraced by the said housing in superimposed relation, said element being equipt with a set of spaced jaws serving to straddle said complementary cover edge and with means for permanently securing said element to the first named cover flap margin, and an actuating lever adapted to bear against and spring one of said jaws away from its adjacent housing part and adjustably clamp said interposed complementary cover edge between said jaw, said lever being externally disposed with respect to the cover member and kept accessible for manipulating purposes.

2. In a removable cover provided with separable longitudinally telescoped flap ends, a clasp secured along the longitudinal margin of one of said ends adapted to clamp the complementary overlapping edge of the other cover end, said clasp comprising a relatively rigid U shaped housing member of which one leg is apertured and provided with a set of trunnion sockets and further comprising a supplementary resilient element embraced by said housing and equipt with a set of jaws serving to straddle said complementary cover edge and of which one jaw portion is provided with means for permanently uniting said element to the first named cover end, and an actuating lever having a latch toe pivotally mounted in said trunnions and operatively connected with one of said jaws through said aperture and adapted to adjustably clamp the jaws about said interposed complementary cover edge, said lever being externally disposed with respect to the cover member and kept accessible for manipulating purposes.

3. In a detachable cover member provided with separable longitudinally telescoped flap ends, a clasp secured along the longitudinal margin of one of said ends adapted to adjustably clamp the complementary overlapping edge of the other cover end, said clasp comprising a relatively rigid U shaped housing member of which one leg is provided with a slot and further comprising a supplementary resilient element equipt with a projecting lip adapted to engage said slot and maintain said element in superimposed embraced relation with respect to the housing, said element being further provided with a set of spaced jaws serving to straddle said complementary cover edge and with ear-means adapted to be permanently united to the first named cover margin, and an actuating lever mounted on the housing and adapted to adjustably clamp said interposed complementary cover edge between the jaws, said lever being externally disposed with respect to the cover member and kept accessible for manipulating purposes.

4. In a removable cover member provided with separable longitudinally telescoped flap ends, a clasp disposed along the longitudinal margin of one of said ends adapted to slidably adjust and clamp the complementary overlapping edge of the other cover end, said clasp comprising a relatively rigid U shaped housing member and a supplementary resilient element embraced by and rockingly mounted within said housing, said element being equipt with a set of laterally disposed rivet ears for permanently securing the clamp to the first named cover margin and also with spaced jaws serving to straddle said complementary cover edge, and an actuating lever mounted on the housing and adapted to clamp the jaws about the aforesaid interposed cover edge, said lever being externally disposed with respect to the cover member and kept accessible for manipulating purposes.

In testimony whereof, I have herewith set my hand this 12th day of March, 1925.

LAWRENCE M. CROW.